G. HARRIS.
Wheelbarrow Wheel.
No. 105,939. Patented Aug. 2, 1870.
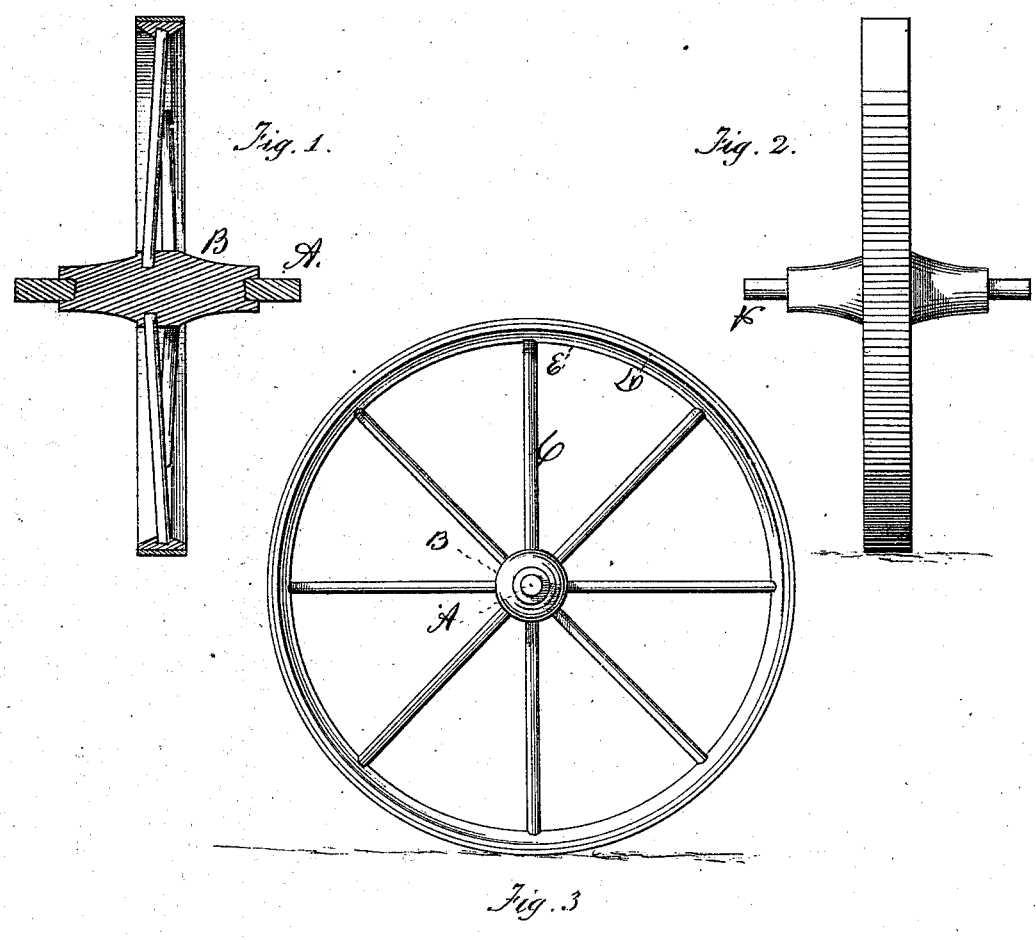

United States Patent Office.

GEORGE HARRIS, OF WEEDSPORT, NEW YORK.

Letters Patent No. 105,939, dated August 2, 1870.

IMPROVEMENT IN WHEELBARROW-WHEELS.

The Schedule referred to in these Letters Patent and making part of the same.

Be it known that I, GEORGE HARRIS, of Weedsport, in the county of Cayuga and State of New York, have invented a new and improved Wheelbarrow-Wheel; and I do hereby declare that the following is a sufficient description thereof, reference being made to the accompanying drawing.

My invention consists in an iron wheel for wheelbarrows, composed of wrought and cast-iron combined, the axle, spokes, and tire being wrought iron, and the hub and felly being cast-iron, the hub and felly being cast solid, with the other named wrought-iron parts.

Figure 1 is a vertical sectional view of the wheel, through the axis of the hub.

Figure 2 is a front elevation of the same.

Figure 3 is a side elevation.

A represents the axle.
B, the hub.
C, the spokes.
D, the tire.
E, the felly.

The hub is cast solid on the axle of wrought iron and the wrought-iron spokes, as arranged, and the felly is cast solid on the outer ends of the spokes and within the wrought-iron tire, the whole consisting of parts combined, arranged, and constructed to form a substantial, durable, and comparatively cheap wheel for wheelbarrows and the like.

I claim as my invention—

A wheelbarrow-wheel, consisting of wrought-iron axle, spokes, and tire, and cast-iron hub and felly, combined, arranged, and constructed as and for the purposes set forth.

GEORGE HARRIS.

Witnesses:
    I. RHEUBOTTOM,
    JAMES M. GILL.